United States Patent [19]

Jackson et al.

[11] Patent Number: 4,963,977

[45] Date of Patent: Oct. 16, 1990

[54] APPARATUS FOR GENERATING A VIDEO SIGNAL REPRESENTING A FIELD OF SPATIALLY VARYING COLOR

[75] Inventors: Richard A. Jackson; John Abt, both of Nevada City, Calif.

[73] Assignee: The Grass Valley Group, Inc., Nevada City, Calif.

[21] Appl. No.: 287,360

[22] Filed: Dec. 21, 1988

[51] Int. Cl.$^5$ .............................................. H04N 9/74
[52] U.S. Cl. ....................................... 358/22; 358/81
[58] Field of Search ................. 358/183, 22, 27, 28, 358/80, 29, 81, 82

[56] References Cited

U.S. PATENT DOCUMENTS

| | | | |
|---|---|---|---|
| 4,636,839 | 1/1987 | Cole | 358/22 |
| 4,758,880 | 7/1988 | McFetridge | 358/19 |
| 4,769,692 | 9/1988 | McFetridge | 358/19 |
| 4,823,183 | 4/1989 | Jackson | 358/183 |
| 4,873,568 | 10/1989 | Jackson | 358/22 |

Primary Examiner—Tommy P. Chin
Attorney, Agent, or Firm—Francis I. Gray

[57] ABSTRACT

Video effects apparatus comprises a wipe generator for generating a wipe signal and a matte generator for generating a matte signal. The matte generator receives the wipe signal and the color represented by the matte signal is dependent on the wipe signal. First and second control signals are provided in response to the wipe signal. A first video mixer has signal input terminals connected to receive a first video signal and the matte signal respectively and a mix control input terminal connected to receive the first control signal as a mix control signal, and a second video mixer has signal input terminals connected to receive respectively a second video signal and the output signal of the first video mixer. The second mixer has a mix control input terminal connected to receive the second control signal as a mix control signal.

4 Claims, 6 Drawing Sheets

APPARATUS FOR GENERATING A VIDEO SIGNAL REPRESENTING A FIELD OF SPATIALLY VARYING COLOR

Background of the Invention

This invention relates to apparatus for generating a video signal representing a field of spatially varying color.

A video mixing system, or switcher, may be used to combine video signals from external video sources to provide an output signal representing a picture in which there is a transition between the image represented by one external signal and the image represented by the other external signal. Such a transition may be accomplished by use of a wipe. In a wipe, the switcher receives input video signals representing two images and changes from one input video signal to the other in response to a wipe signal, which defines a predetermined wipe pattern. FIG. 1 illustrates a simple split screen wipe, where the left side of the output picture is the left side of one input image and the right side of the output picture is the right side of the other input image. In this case, a wipe signal having a ramp waveform, which is a low voltage in areas corresponding to the left side of the picture and a high voltage in areas corresponding to the right side of the picture, as shown by waveform A in FIG. 2, is generated. This wipe signal becomes the input to a clip and gain circuit (FIG. 3). The clip and gain circuit comprises a comparator 2, in which a clip level is subtracted from the voltage of the wipe signal, and the resulting difference signal (waveform B) is amplified by a multiplier 4 to provide an output signal (waveform C) which is level shifted at 6 and limited at 8 to provide a mix signal (waveform D). The mix signal is applied to the control input of a mixer 10 that receives the external video signals at its two video inputs. The clip level is under operator control and sweeps through a range of values as a manually-operated control, such as a lever arm, is swept through a range of positions. In this way, the transition region between the two component images may be moved horizontally, e.g. from left to right of the field. It is possible to vary the width of the strip over which the transition between the two images takes place by adjusting the gain control signal applied to the multiplier. The wider the strip, the "softer" is the transition.

Conventional wipe generators are able to provide a wide variety of wipes in addition to the horizontal wipe described with reference to FIG. 1, such as rectangular wipes and annular wipes.

In a video effects apparatus, it is conventional for the input video signal to have an associated key signal. The key defines an area of the picture field. The value of the key lies in the range from zero to one. When the video signal is multiplied by the key, the video signal is driven to zero at locations for which the value of the key is zero.

A switcher generally includes several internal matte generators, each of which generates a full field video signal representing a single color. These matte generators may be used as general purpose video sources. One use of a matte signal is to accentuate a transition between images provided by external video sources. In FIG. 4, a wipe signal which represents a vertical line on the video field at a position that depends on a clip level, as in the case of FIGS. 1 and 2, is applied to a first clip and gain circuit 12. In the circuit 12, a first clip level is applied to the wipe signal to generate a mix control signal that is applied to a first mixer 13 to control mixing of a first external video signal (video A) with a matte signal. In a second clip and gain circuit 14, a second clip level is applied to the same wipe signal to generate a mix control signal that is applied to a second mixer 15 to control mixing of the output signal provided by the first mixer 13 with a second external video signal (video B). As shown in FIG. 5, in which field 16 represents video A, field 17 represents the matte and field 18 represents video B, the output picture represented by the signal provided by the second mixer 15 (field 19) is composed of portions of the images represented by the two external video signals, separated by a band of the matte color. The two clip levels may be created by adding offsets of equal magnitude and opposite sign to the clip level used in the case of the simple horizontal wipe, so that as the latter clip level is adjusted (and the offsets remain constant) the band sweeps across the field. If the gains of the two clip and gain circuits 12, 14 are different, the softness of the transition from one image to the matte color is different from the transition from the matte color to the other image.

A signal representing a matte of spatially varying color may be generated by mixing two or more flat matte signals under control of a wipe signal. However, this involves using a substantial part of the resources of a typical switcher and therefore limits the effects that can be performed by the switcher simultaneously with generation of the matte signal.

Moreover, if a signal representing a matte of spatially varying color is used in the circuit shown in FIG. 4, to accentuate a transition between two external images, the distribution of color over the matte portion of the output picture changes as the clip levels change, and this may divert attention from the external images.

Summary of the Invention

A preferred video effects apparatus embodying the present invention in a first aspect comprises a wipe generator for generating a wipe signal and a matte generator for generating a matte signal. The matte generator receives the wipe signal and the color represented by the matte signal is dependent on the wipe signal. At least a first control signal is provided in response to the wipe signal. Mixer means have signal input terminals for receiving first and second video signals and the matte signal and also have a mix control input terminal connected to receive the first mix control signal. The mixer means provide an output signal representing a picture composed of a first image portion represented by the first video signal, a second image portion represented by the second video signal, and a band between the first and second image portions, the band being represented by the matte signal.

A preferred embodiment of the present invention in a second aspect is a matte generator comprising memory means having a plurality of separately addressable storage locations, for storing respective sets of coefficients representative of a plurality of colors respectively, and addressing means for addressing the memory means. The addressing means comprise input means for receiving an initial address word that defines the location of a first set of the coefficients, means for providing a control signal, and means for additively combining the initial address word with the control signal to provide an address signal and for applying the address signal to the memory means.

A preferred embodiment of the invention in a third aspect is a matte generator comprising random access memory means having a plurality of separately addressable storage locations, means for loading sets of coefficients representative of respective colors into the storage locations respectively, and addressing means for addressing the storage locations successively to read out the sets of coefficients. The addressing means comprise a first circuit for providing a signal defining a single amplitude value for each of a multiplicity of locations in two-dimensional space, a second circuit for acting on said signal and providing, in response thereto, an address signal defining a single storage location in the random access memory means for each such amplitude value, and means for applying the address signal to the memory means.

Brief Description of the Drawings

For a better understanding of the invention, and to show how the same may be carried into effect, reference will now be made, by way of example, to the accompanying drawings in which.

Detailed Description

Figure 1:
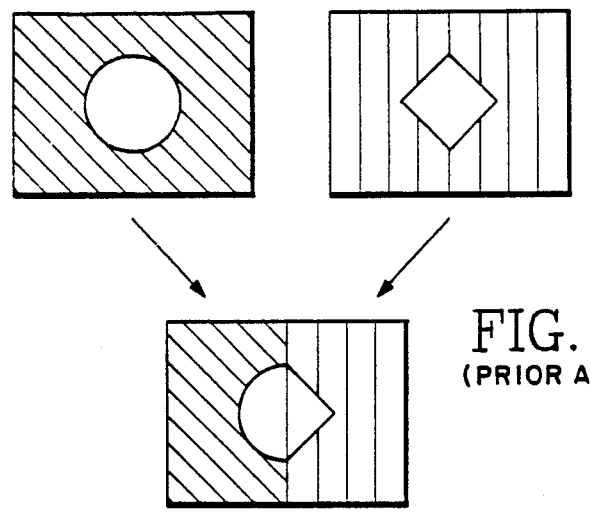
FIG. 1 illustrates schematically the visual effect of a split-screen wipe.
Figure 2:
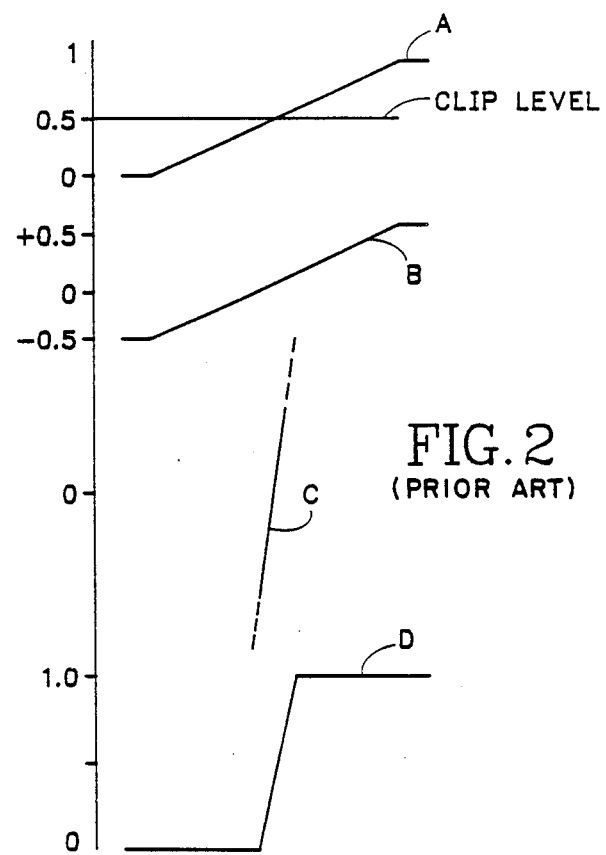
FIG. 2 illustrates waveforms useful in understanding how a wipe is performed.
Figure 3:
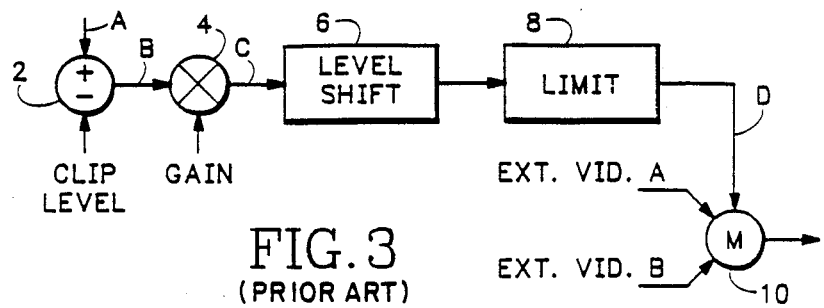
FIG. 3 is a block diagram of a clip and gain circuit.

The switcher illustrated in FIG. 6 will be described in the context of a horizontal wipe from an image represented by a first external video signal (video A) to an image represented by a second external video signal (video B). The switcher comprises a wipe signal generator 20 whose output signal (waveform A) is applied to two clip and gain circuits 22 and 26 which receive respective gain control signals and respective clip level signals (levels B and C) from an operator interface 36. The operator interface 36 includes a manual control, such as a lever arm 361, which drives an angle encoder 362. The angle encoder generates a signal which is representative of the angular position of the lever arm and is applied to a clip level generator 363. The clip level generator 363 provides three clip level signals. Two of the three clip level signals are applied to the clip and gain circuits 22 and 26. The difference between the first and second clip levels is controlled by a border width control knob 364. The operator interface also includes a softness control knob 365 which drives a gain control signal generator 366. The gain control signal generator provides the gain control signals to the clip and gain circuits 22 and 26 and also provides a third gain control signal. It will be assumed for the sake of convenience that the gain control signals applied to the clip and gain circuits 22 and 26 are the same, but this not essential.

The wipe signal provided by the wipe signal generator 20 has a ramp waveform that repeats at line rate and has a small value at locations corresponding to the left edge of the field and a high value at locations corresponding to the right edge of the field. The clip level B applied to the clip and gain circuit 22 is lower than the clip level C applied to the clip and gain circuit 26, and accordingly the mix control signals applied to the mixers 30 and 32 have the waveforms D and E shown in FIG. 7, each having a ramp portion and the two ramp portions being separated in time.

The switcher also comprises a matte generator 28. The output signal of the matte generator is applied to one video input terminal of a first linear mixer 30 which receives video A at its other video input terminal and receives the output signal of the first clip and gain circuit 22 at its mix control input. A second linear mixer 32 receives the output signal of the first linear mixer 30 (video A') at one video input terminal and video B at its second video input terminal. The second mixer 32 receives the output signal of the second clip and gain circuit 26 at its mix control input. The output signal of the mixer 32 represents a picture composed of a portion of the video A image and a portion of the video B image, the two portions being separated by a vertical band of which the color depends on the matte generator 28.

Figure 6:
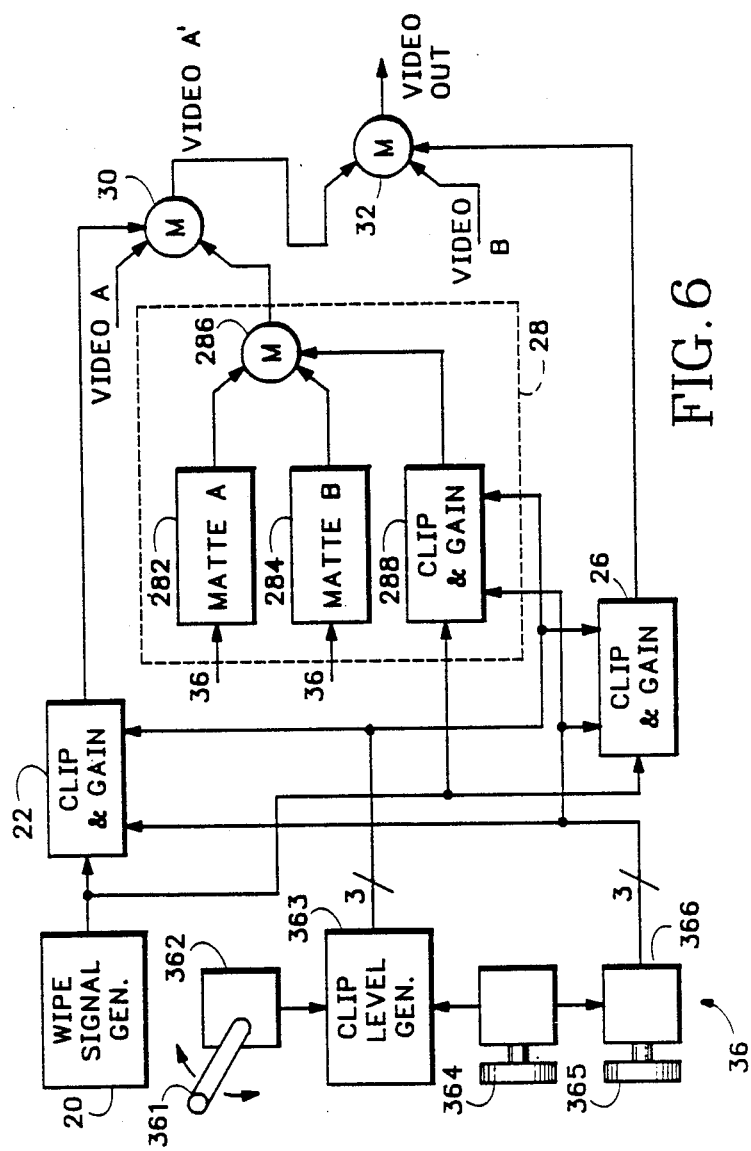
FIG. 6 is a simplified block diagram of part of a first switcher embodying the present invention.

The matte generator 28 illustrated in FIG. 6 comprises two flat matte generators 282 and 284, which provide output video signals representing respective flat mattes. The colors represented by these output video signals are adjustable under operator control. The output video signals provided by the matte generators 282 and 284 are applied to a third linear mixer 286, whereby they are mixed under control of a mix control signal received from a third clip and gain circuit 288. The clip and gain circuit 288 receives the wipe signal provided by the wipe signal generator 20, the third clip level signal provided by the clip level generator 363, and the third gain control signal provided by the gain control signal generator 366. Accordingly, the output signal provided by the mixer 286, which is the matte signal applied to the mixer 30, is a linear mix of the flat matte signals provided by the matte generators 282 and 284, with the mix ratio being dependent on the output signal of the third clip and gain circuit 288.

The third clip level signal defines a clip level F that is halfway between the first and second clip levels. The third gain control signal provided by the gain control signal generator 366 depends on the setting of the border width control knob and is such that the output signal of the third clip and gain circuit 288 passes through its entire range of values in a time corresponding to the interval between the ramp portions of the waveforms D and E. Accordingly the waveform of the output signal provided by the clip and gain circuit 288 includes a ramp portion of which the midpoint occurs halfway between the midpoints of the ramp portions of the waveforms D and E and of which the slope is such that the ramp starts at the time of the midpoint of the ramp portion of the waveform D and ends at the time of the midpoint of the ramp portion of the waveform E. Therefore, if the color represented by the output signal of the matte generator 282 is a fully saturated blue and that represented by the output signal of the matte generator 284 is a fully saturated red, the output signal represented by the matte generator 28 will represent a fully saturated blue on one side of the field, a fully saturated red on the other side of the field and a transition from blue to red, through magenta, over the band corresponding to the ramp portion of the waveform G. The band appears in the composite picture represented by the output signal of the mixer 32, and its position relative to the borders between the image portions and the matte remains constant during the wipe.

Figure 7:
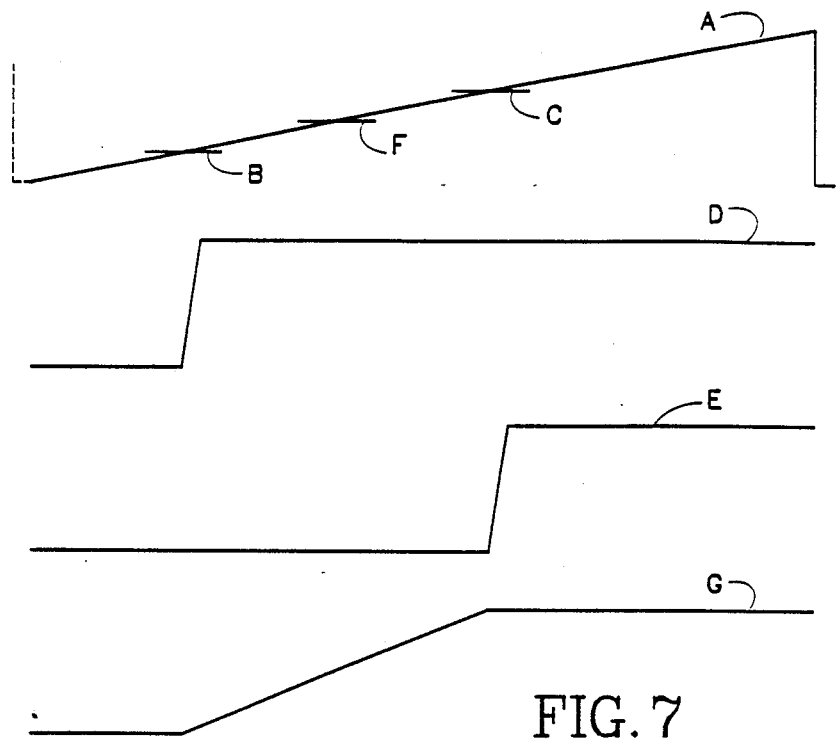
FIG. 7 illustrates waveforms useful in describing operation of the FIG. 6 switcher.

In the case of FIG. 7, the color change band occupies the entire band between the portions of the two images (video A and video B) that are used to form the output picture. However, the gain control signal applied to the third clip and gain circuit 288 is adjustable to allow the width of the color change to be varied, e.g. so that it occupies only a small part of the width of the band between the portion of the video A image and the portion of the video B image. Also, by adjusting the third clip level the position the color change band relative to the image portions may be adjusted.

Figure 8:
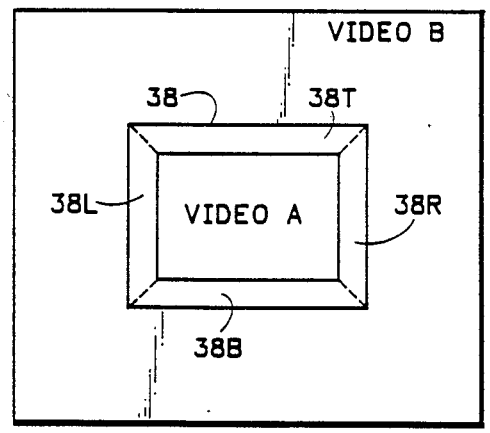
FIG. 8 illustrates a video field with a rectangular border.

The switcher shown in FIG. 6 is not limited to performing linear wipes, in which the wipe solid is a plane. For example, the wipe signal generator 20 might generate a wipe signal representing a pyramidal wipe solid, in which case the border 38 between the two image portions represented respectively by the external video signals is rectangular and surrounds one of the image portions, as shown in FIG. 8. In this case, on a given scan line that traverses the border, the slope of the output of the third clip and gain circuit 288 has a magnitude greater than one in the area 38L, is of equal magnitude but opposite sign in the area 38R, and is zero in the areas 38T and 38B. Then, along that scan line, the color changes in one sense within the area 38L, remains constant within the area 38T or 38B, and changes in the opposite sense within the area 38R.

The switcher illustrated in FIG. 6 may be implemented in the digital or analog domain. In the case of a digital implementation, each flat matte generator 282, 284 would comprise three color component registers, the three values stored in each set of registers being the values necessary to generate the color represented by the matte signal. In the case where the components are luminance and chrominance, the values stored in the luminance register may be read at a frequency of 13.5 MHz, while the values stored in the two chrominance registers are each read at half that frequency, the two chrominance registers being selected alternately so that for each time the luminance value is read, one of the chrominance values is read.

Figure 9:
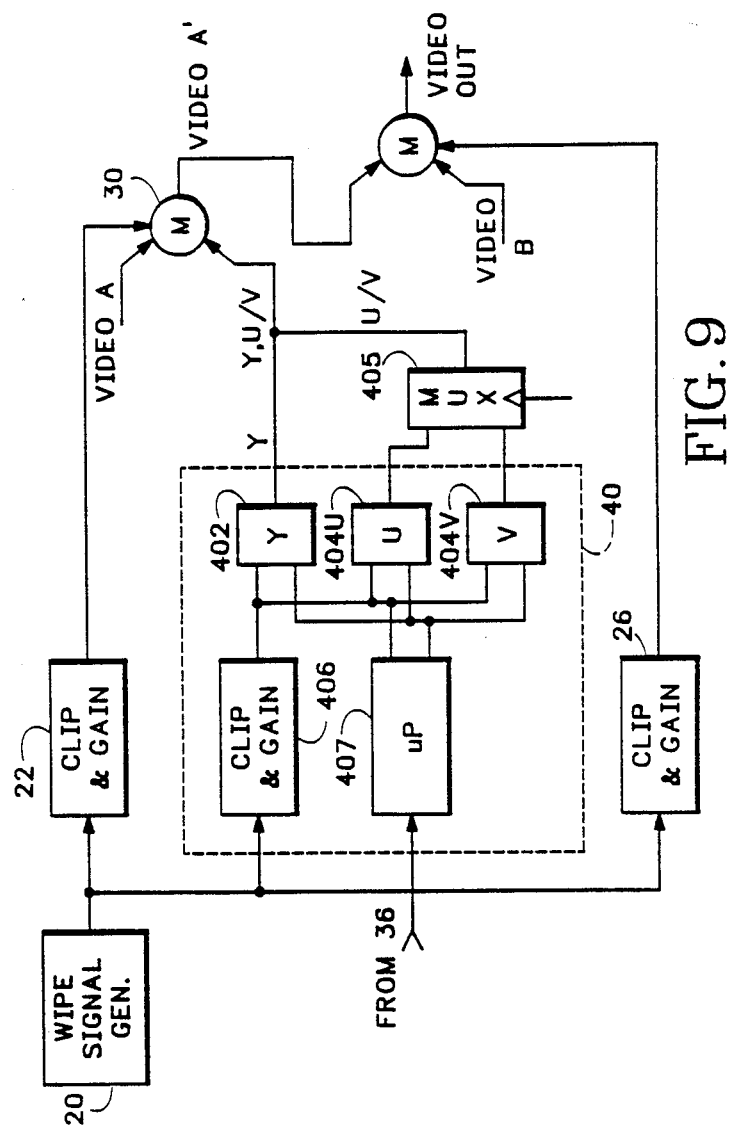
FIG. 9 is a simplified block diagram of part of a second switcher embodying the present invention.

The switcher illustrated in FIG. 6 provides a transition from one color to another color along a direct linear path over the color circle. The switcher shown in FIG. 9 is not limited to the transition being along a linear path. The FIG. 9 switcher is similar to the digital implementation of the FIG. 6 switcher, except with respect to the matte generator. The matte generator 40 of the FIG. 9 switcher comprises a luminance memory 402 and a chrominance memory 404. The chrominance memory 404 is in two portions 404U and 404V, the outputs of which are selectable by a multiplexer 405. The three memories 402, 404U and 404V are random access memories. Through the operator interface 36, the operator instructs a microprocessor 407 to calculate a set of three component values for each of, say, 256 colors, in a sequence set by the operator, and load these sets of values into sequentially-addressed storage locations of the memories 402, 404U and 404V. The colors represented by the component values loaded into the memories 402 and 404 may be contiguous colors on the color circle, but this is not essential: any sequence of colors may be used. The matte generator 40 also includes a clip and gain circuit 406. The output of the clip and gain circuit 406 has a range from decimal 0 to decimal 255. The circuit 406 is configured so that its output at the beginning of a transition is decimal 0. This may be accomplished by applying the same clip level signal to both the clip and gain circuits 22 and 406, and omitting the offset block from the circuit 406. The output signal of the clip and gain circuit 406 is used to address the memories 402 and 404 for reading the sets of component values. For different values of the wipe signal, the output signal of the clip and gain circuit 406 has different values in the range from 0 to 255 and therefore different sets of component values are read from the memories 402 and 404. If the wipe signal varies such that the output of the clip and gain circuit 406 sweeps linearly through its range from decimal 0 to decimal 255 over a band of the video field, the color represented by the output signal of the matte generator sweeps linearly through the gamut of 256 selected colors over that band.

Figure 4:
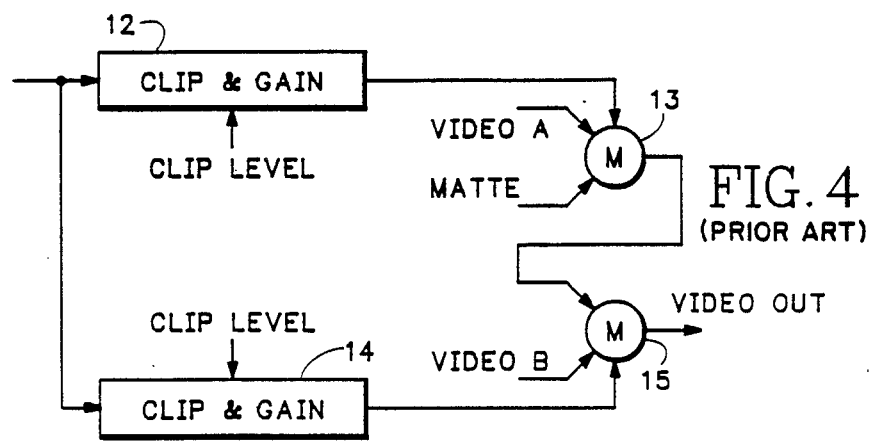
FIG. 4 is a simplified block diagram of part of a switcher of conventional type.
Figure 5:
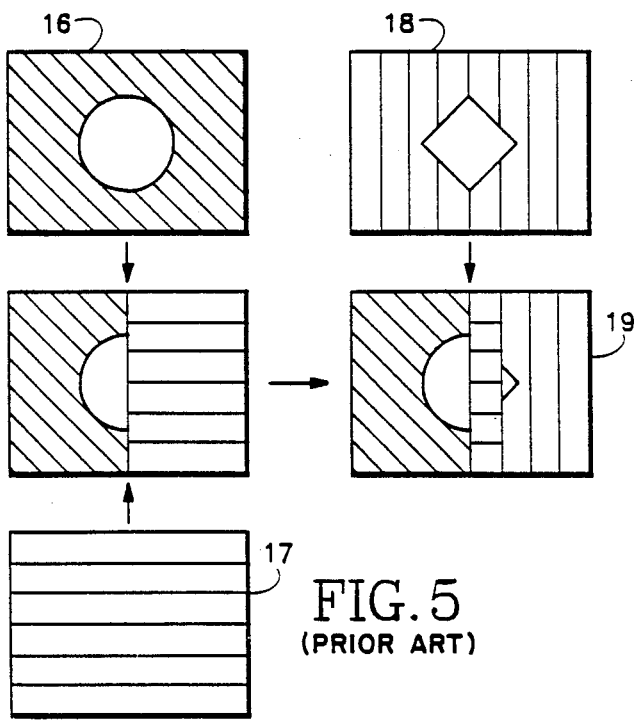
FIG. 5 illustrates schematically the visual effect of a border wipe.
Figure 10:
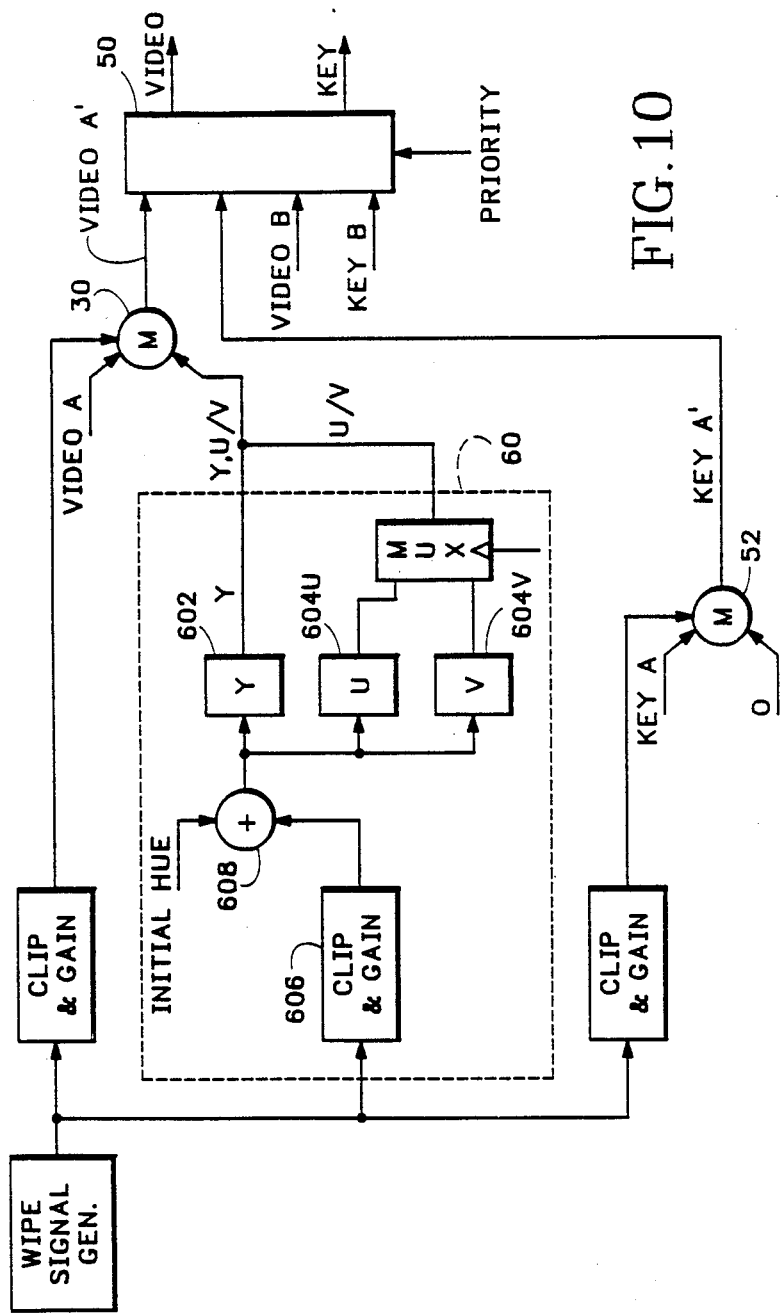
FIG. 10 is a simplified block diagram of part of a third switcher embodying the present invention.

A third form of matte generator is shown in FIG. 10. FIG. 10 also illustrates that the invention is not restricted to the switcher architecture shown in FIG. 4, in which full field video signals are processed, but may also be applied to the architecture used in the Kaleidoscope switcher manufactured by The Grass Valley Group, Inc. In the switcher shown in FIG. 10, the output signal of the mixer 30 (video A') is applied to a video combiner 50, which may be of the type described and claimed in U.S. Pat. No. 4,851,912 issued Jul. 25, 1989 to Jackson et al entitled "Apparatus for Combining Video Signals", the disclosure of which is incorporated by reference herein. The second linear mixer, designated 52 in FIG. 10, does not receive video signals but receives a key signal (key A) associated with video A and also receives a signal representing zero. The output signal of the mixer 52 (key A') is applied as a key signal to the video combiner 50, which also receives a second video signal (video B) and a key signal (key B) associated therewith, as well as a priority signal. The output signal provided by the video combiner is a weighted sum of the product of video A' and key A' and the product of video B and key B, with the weighting factor being a function of the priority signal, as described in the above-identified patent.

The matte generator 60 of the FIG. 10 switcher comprises three programmable read only memories 602, 604U and 604V which store respectively the luminance value and two chrominance values for each of, say, 256 fully saturated colors, distributed equiangularly about the color circle. The matte generator 60 also includes a clip and gain circuit 606, similar to the clip and gain circuit 406 of FIG. 9, and an adder 608. The adder receives an 8 bit output signal provided by the clip and gain circuit 606 at one input and receives another 8 bit signal at its other input. The MSB of the 9 bit output signal of the adder 608 is truncated, and the resulting 8 bit signal is applied as an address signal to the memories 602 and 604, pointing to the luminance and chrominance values required to specify one of the 256 fully saturated colors.

The address words for the desired initial and final hues of a transition are specified by the operator through the operator interface (not shown), as is the polarity of the gain. The initial hue is applied to the adder 608 as its second input. The operator interface uses the difference between the words specifying the initial and final hues and the width of the band specified by the border width control signal to calculate the gain required such that at the boundary between the matte and the second component image, the output of the adder will be the word specifying the final hue. Since the output signal of the clip and gain circuit 606 at the beginning of a transition is decimal 0, the address word applied to the memories 602 and 604 at the beginning of the transition is the address word for the initial hue provided by the operator interface. As the output signal provided by the clip and gain circuit changes during the transition, the output signal provided by the adder 608 similarly changes and points successively to different colors, until at the end of the transition the output signal points to the final hue.

It will be appreciated that the present invention is not restricted to the particular embodiment that has been described and illustrated, and that variations may be made therein without departing from the scope of the invention as defined in the appended claims and equivalents thereof. In particular, as indicated previously, the invention is not restricted to any particular wipe pattern.

We claim:

1. A matte generator comprising:
   memory means, having a plurality of separately addressable storage locations, for storing respective sets of coefficients representative of a plurality of colors respectively, and
   addressing means for addressing the memory means, said addressing means comprising input means for receiving an initial address word that defines the location of a first set of the coefficients, means for providing a control signal, and means for additively combining the initial address word with the control signal to provide an address signal and for applying the address signal to the memory means.

2. A matte generator according to claim 1, further comprising a wipe generator for generating a wipe signal, and wherein the means for providing the control signal comprise a clip and gain circuit which receives the wipe signal and provides the control signal in response thereto.

3. A matte generator comprising:
   random access memory means having a plurality of separately addressable storage locations,
   means for loading sets of coefficients representative of respective colors into the storage locations respectively, and
   addressing means for addressing the storage locations successively to read out the sets of coefficients, said addressing means comprising a first circuit for providing a signal defining a single amplitude value for each of a multiplicity of locations in two-dimensional space, a second circuit for acting on said signal and providing, in response thereto, an address signal defining a single storage location in the random access memory means for each such amplitude value, and means for applying the address signal to the memory means.

4. A matte generator according to claim 3, wherein the first circuit comprises a wipe generator for providing a wipe signal and the second circuit comprises a clip and gain circuit which receives the wipe signal and provides the address signal in response thereto.

* * * * *